June 27, 1950     A. KRUCZEK     2,513,027
BALL AND SOCKET TYPE SUPPORT
Filed April 21, 1948
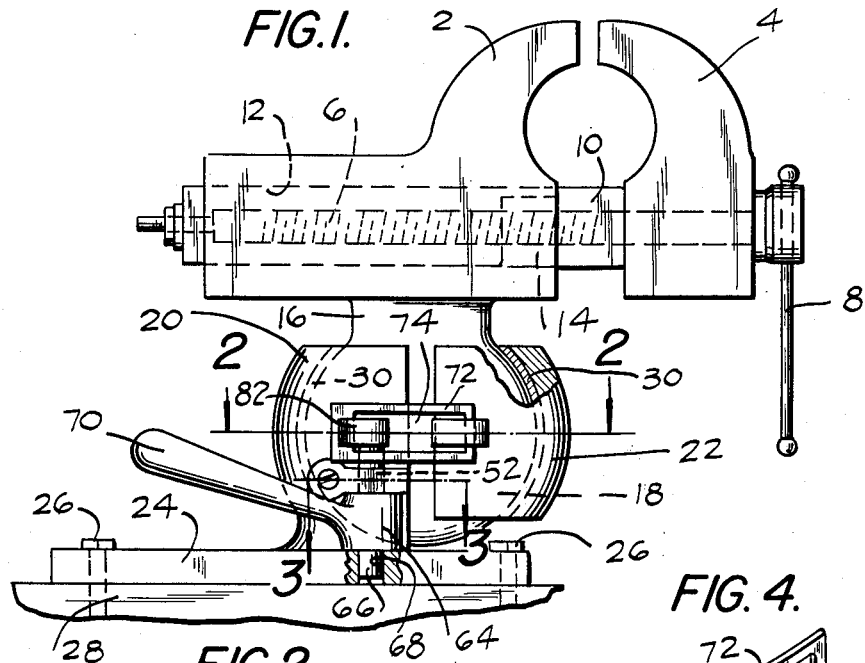
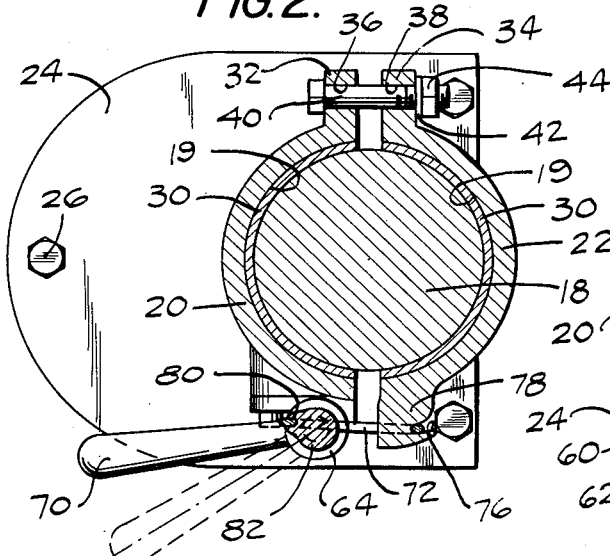
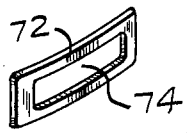
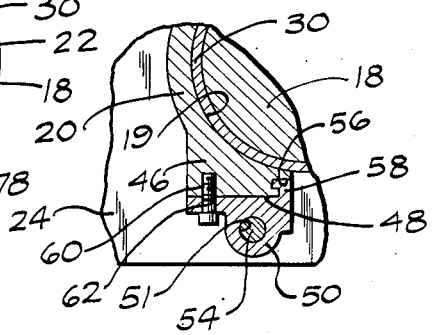
INVENTOR.
Andrew Kruczek
BY Patented June 27, 1950

2,513,027

UNITED STATES PATENT OFFICE 2,513,027

BALL AND SOCKET TYPE SUPPORT

Andrew Kruczek, Detroit, Mich.

Application April 21, 1948, Serial No. 22,319

1 Claim. (Cl. 248—181)

My invention relates to tool mountings, and more particularly to a mounting adapted to provide universal movement when applied to a bench vise.

The object of my invention is to provide a ball and socket type tool support of the split-socket type, one of the socket portions being stationary, the other being movable so as to clamp a ball member provided on a tool support, the clamping means including a slotted resilient link actuated by a handle-operated eccentric.

My invention consists in the construction, arrangement and combination of the various parts of the device, whereby the object contemplated is attained as set forth, hereinafter, and pointed out in my claim, and illustrated in the accompanying drawing, in which:

Fig. 1 is a side elevation of my new, improved vise mounting applied to a conventional bench vise, Fig. 2 is a horizontal sectional view taken along line 2—2 of Fig. 1, Fig. 3 is also a horizontal sectional view taken along line 3—3 of Fig. 1, and Fig. 4 is a perspective view of a resilient link used in the invention.

In the drawing a conventional vise is illustrated having a stationary jaw 2 and moveable jaw 4, the jaw 4 being adapted to be moved to or from clamping position by a threaded feed screw 6, turned manually by a handle 8 at one end. A slide portion 10, integrally mounted with jaw 4, is received within a bore 12 in jaw 2, and a cooperating nut portion 14, formed integral with jaw 2, serves to open and close jaw 4, when the feed screw 6 is rotated.

I have shown a column 16, integrally mounted with the stationary jaw member 2, and terminating in a spherical, polished ball shape 18. It is to be understood, however, that when used with existing vises or other tools, the column may have a suitable bolting flange to attach the column to the tool. The spherical ball is arranged to be gripped by a pair of complementary, concave cup or socket members 20 and 22, clearly shown in Fig. 1, of the drawing. Socket member 20 is formed integral with a base or supporting plate 24 that can be bolted as at 26 to a work bench 28.

Positioned in the inner concave surface 19 of the socket members 20 and 22 I have shown a friction lining material 30. This may be fastened by screws, adhesive, or may be a sprayed metallized friction surface. The socket member 22 is adapted to be moved relative to the socket member 20 for clamping the spherical ball 18 in any relative universal plane, or for releasing the socket member 22 for alternate adjustments of the column 16, novel means being provided to effect such clamping movement.

The socket members 20 and 22 are preferably cast, or may be drawn into a spherical shape, and are provided on one side with bolting flanges 32 and 34, having holes 36 and 38 therein to receive a bolt 40 therethrough, said bolt being secured by a lock washer 42 and nut 44. Positioned diametrically opposite the flanges 32 and 34 is a releasing mechanism, permitting movement or setting of the spherical ball 18. This is accomplished by forming a pad 46 (see Fig. 3) upon the socket member 20, said pad having a surface 48 for assembly of a journal block 50, said block having a bore 51 for a bearing portion 52 (see Fig. 1) of an operating shaft 54. The pad 46 is slotted as at 56, for receiving a projection 58 formed at one side of the journal block. A screw 60 passing thru a hole 62 and threaded into the pad 46, provides, in combination with the slot and projection, means for securing the journal block to the stationary socket 20, whereby the operating shaft 54 is journaled intermediate its ends. The slot 56 and projection 58 may be replaced by a positioning dowel pin if desired. The operating shaft 54 has an enlarged boss 64 of dimensional length fitting between one face of the journal block and the upper face of the base 24. A reduced journal portion 66 is fitted in a bore 68 formed in the base. An operating handle 70, formed on the boss 64, is used to rotate the operating shaft.

To accomplish a rigid clamping and releasing action of the socket member 22, I provide a resilient and slightly curved link 72. This link is generally rectangular, and has a similar rectangular opening 74 therein. This opening, in combination with a proportionate thickness of material, serves to impart inherent resiliency to the link, for a purpose presently described. The link 72 is fitted into a slot 76 (see Fig. 2), formed in a projection 78 of the socket member 22. The opposite side of the link is fitted into a similar slot 80 formed in a head portion 82 integral with the upper end of the operating shaft 54.

In operation of the securing and releasing mechanism, the nut 44 is turned on the bolt 40, so as to apply a nominal force or pressure between the friction surfaces 30 and the spherical ball 18. The operating handle at this time, would be in the released position shown by the dotted lines 70A in Fig. 2 of the drawing. In this position the link 72 would have an arcuate configuration as shown in Fig. 4 of the drawing. Again referring to Fig. 2, showing the socket 22 in clamped position, it will be observed that link 72 is substantially flat. Also it will be observed that the axis of the link is angularly disposed, that is, an angular relation is defined between the center of the operating shaft 54 and the axis of the link 72. This geometrical relation can be defined as "over center" or "toggle movement." This feature serves to maintain the mechanism in full locked position, against vibration or the like during use.

It is appreciated that certain changes, alterations and modifications may be made by those skilled in the art, without departing from the scope of the invention, and I wish to avail myself of any and all that may come within the purview of the appended claim.

I claim:

In an adjustable support of the character described, comprising: a column having at its lower end a spherical ball adapted to be gripped frictionally by a pair of cooperating hemispherical sockets, one of the sockets being stationary and the other moveable, both sockets having projecting ears at one side and accommodating a bolt and nut means for initial setting or adjustment, the stationary socket being mounted on a base, a bearing mounted on the other side of said stationary socket and suitably journalling an operating shaft, said shaft having an actuating handle, and having an eccentric at its upper end, said eccentric having a slot extending in spaced and parallel relation to the journal axis of said shaft, the other side of the moveable socket having a projection confronting said eccentric, the side of said projection remote from said eccentric being provided with a slot extending in parallel relation to said eccentric slot, a rectangular, resilient, clamping link having a central opening fitting over said eccentric and projection, opposite ends of said link engaging in the slots so that by swinging said actuating handle, the eccentric will move the adjacent end of the resilient link and cause the moveable socket to be drawn into frictional contact with the spherical ball.

ANDREW KRUCZEK.

REFERENCES CITED

The following references are of record in the file of this patent:

UNITED STATES PATENTS

| Number | Name | Date |
| --- | --- | --- |
| 38,273 | Allen | Apr. 28, 1863 |
| 1,413,676 | McCarter | Apr. 25, 1922 |
| 2,260,995 | Kruczek | Oct. 28, 1941 |
| 2,260,996 | Kruczek | Oct. 28, 1941 |
| 2,302,523 | Borsella | Nov. 17, 1942 |